United States Patent
Eliyahu et al.

(10) Patent No.: US 8,817,365 B2
(45) Date of Patent: Aug. 26, 2014

(54) HYBRID OPTICAL AMPLIFIER WITH OPTIMIZED NOISE FIGURE

(75) Inventors: Tomer Eliyahu, Elad (IL); Eyal Sarid, Eli (IL); Uri Ghera, Tel Aviv (IL); David Menashe, Tel-Aviv (IL)

(73) Assignee: Finisar Israel Ltd., Holon (IL)

( * ) Notice: Subject to any disclaimer, the term of this patent is extended or adjusted under 35 U.S.C. 154(b) by 217 days.

(21) Appl. No.: 13/552,864

(22) Filed: Jul. 19, 2012

(65) Prior Publication Data

US 2014/0022626 A1    Jan. 23, 2014

(51) Int. Cl.
| | | |
|---|---|---|
| *H04B 10/17* | (2006.01) | |
| *H01S 3/30* | (2006.01) | |
| *H04B 10/291* | (2013.01) | |
| *H01S 3/067* | (2006.01) | |
| *H04B 10/12* | (2006.01) | |
| *H01S 3/16* | (2006.01) | |
| *H01S 3/23* | (2006.01) | |

(52) U.S. Cl.
CPC .............. *H01S 3/30* (2013.01); *H01S 3/1608* (2013.01); *H01S 2301/02* (2013.01); *H04B 10/2914* (2013.01); *H01S 2301/04* (2013.01); *H04B 10/2916* (2013.01); *H01S 3/06758* (2013.01); *H01S 3/302* (2013.01); *H01S 3/2375* (2013.01)
USPC .................................... 359/334; 359/341.41

(58) Field of Classification Search
USPC .................. 359/334, 341.41, 341.1
See application file for complete search history.

(56) References Cited

U.S. PATENT DOCUMENTS

| | | | |
|---|---|---|---|
| 6,049,413 A * | 4/2000 | Taylor et al. ................ 359/337 |
| 6,466,362 B1 * | 10/2002 | Friedrich ...................... 359/334 |
| 6,611,641 B2 | 8/2003 | Ghera et al. |
| 6,665,114 B2 | 12/2003 | Benjamin et al. |
| 6,760,150 B2 * | 7/2004 | Goto et al. ............... 359/337.12 |
| 7,522,334 B2 * | 4/2009 | Stephens .................. 359/337.1 |
| 2002/0176156 A1 | 11/2002 | Gurusami et al. |
| 2003/0076578 A1 * | 4/2003 | Goto et al. ................. 359/337.4 |
| 2003/0161031 A1 * | 8/2003 | Benjamin et al. ......... 359/337.4 |
| 2005/0180757 A1 * | 8/2005 | Nissov et al. ................. 398/147 |
| 2011/0141552 A1 | 6/2011 | Ghera et al. |

FOREIGN PATENT DOCUMENTS

EP        1909414        4/2008

OTHER PUBLICATIONS

EP13176684 Search Report of the European Patent Office, Oct. 24, 2013.
Yongnan Li, Wengang Guo, Chenghou Tu, Ting Lei, Te Ha, Dai Wei, Fuyun Lu; Experimental research of wideband and gain-flattened hybrid Raman/erbium-doped fiber amplifier; Optical Engineering; Dec. 14, 2007; pp. 125004-1-125004-4; vol. 46, Issue 12.

* cited by examiner

*Primary Examiner* — Eric Bolda
(74) *Attorney, Agent, or Firm* — Nathan & Associates Patent Agents Ltd.; Menachem Nathan

(57) ABSTRACT

Methods for optimizing a noise figure of a variable gain hybrid amplifier (HA) which includes a variable gain Raman amplifier with adjustable average gain $G_R$ and gain tilt $T_R$ and a variable gain lumped amplifier with adjustable average gain $G_L$ and gain tilt $T_L$. In various embodiments, the methods include receiving as input a required hybrid amplifier average gain $G_H$ value and a required gain tilt $T_H$ value and deriving a set of $G_R$, $T_R$, $G_L$ and $T_L$ values which yield an optimal optimized hybrid amplifier NF and satisfy the conditions $G_R+G_L=G_H$ and that $T_R+T_L$ is within a specified hybrid amplifier operating tilt range. In some embodiments, the derived $T_R$ and $T_L$ values satisfy the condition $T_R+T_L=T_H$.

20 Claims, 9 Drawing Sheets

HYBRID OPTICAL AMPLIFIER WITH OPTIMIZED NOISE FIGURE

FIELD

Embodiments disclosed herein relate generally to optical fiber amplifiers used in fiber optics telecommunications systems and more particularly to hybrid Raman-lumped amplifiers

BACKGROUND

A modern optical communication system utilizes optical amplifiers to amplify wavelength division multiplexed (WDM) signal channels as they are transmitted through the system. These amplifiers may be placed at the receiving and transmitting ends of the system, as well as between the various transmission fiber spans comprising the system.

An optical amplifier is characterized, amongst others, by its gain and its noise figure (NF), the latter quantifying the noise introduced by the amplifier into the system. In the case of a WDM system, where the WDM signal channels occupy a signal wavelength band, the optical amplifier is also characterized by the spectral dependence of the gain and the NF within this band. Three main quantities are of interest: (1) the average gain, defined as the gain averaged over the wavelength band; (2) the gain tilt, defined by performing a linear fit to the spectral gain curve over the wavelength band, and calculating the gain difference between the linear fit at the long wavelength (so called "Red") end of the band, and the linear fit at the short wavelength (so called "Blue") end of the band; and (3) the maximum NF, defined as the maximum value of the NF over the wavelength band. Unless specifically stated otherwise, the term "NF" used herein will be taken to mean the maximum NF. Unless specifically stated otherwise, all values of gain, gain tilt, attenuation and NF are assumed to be in decibel (dB) units.

In many cases it is beneficial for an optical amplifier to have variable gain functionality. This means that the average gain of the amplifier can be dynamically set to any value within a specified range of values, while at the same time maintaining the gain tilt within required specifications for any setting of the average gain. This variable gain functionality allows the same type of amplifier to be used for different systems and at different locations within a system which require different levels of average gain. In some cases it is also desirable to be able to dynamically set the gain tilt within a certain range of values independently of the average gain.

One type of optical amplifier is a lumped amplifier, which is a completely self-contained unit with well-defined input and output ports, and in which the entire amplification process taking place within the unit. The most commonly deployed example of a lumped optical amplifier is an Erbium doped fiber amplifier (EDFA), which contains at least one length of Erbium doped fiber (EDF) and at least one pump laser diode. The EDF serves as the gain medium which transfers energy from the pump laser diodes (or diodes) to the optical signal channels as they pass through the amplifier, thus providing signal amplification. A lumped amplifier may contain a variable optical attenuator (VOA), which provides variable gain functionality by allowing the average gain to be adjusted by controlling the VOA. In general, increased VOA attenuation results in decreased average gain. In most practical cases, in order to increase the efficiency of the amplifier, the VOA is placed between two gain stages within the amplifier, rather than at the amplifier output. One result is that an increase in the VOA attenuation also results in an increase in the amplifier NF, due to the extra loss imparted to the signal channels. Thus, the amplifier NF increases as the average gain decreases. In many cases it is also possible to independently adjust the gain tilt and the average gain by jointly controlling the VOA attenuation and the pump power used to pump the amplifier. For example, in a variable gain EDFA designed for the C-Band, increasing the VOA attenuation while adjusting the pump power to maintain a constant average gain will decrease the gain tilt (make it more negative). Conversely, decreasing the VOA attenuation while adjusting the pump power to maintain a constant average gain will increase the gain tilt (make it more positive).

In recent years, a new type of amplifier, namely a distributed Raman amplifier (also referred to herein simply as "Raman amplifier" or in short "RA"), has been introduced into optical communication systems. A significant difference between a lumped amplifier and a Raman amplifier is that for the latter, the transmission fiber itself serves as the gain medium, meaning that the signal channels are amplified as they travel through the transmission fiber. Thus, the Raman amplifier itself just provides Raman pump power and control functionality, while the actual amplification process takes place in a distributed manner along the transmission fiber. The distributed nature of the amplification improves the optical signal to noise ratio (OSNR) of the system compared to the case where an equivalent lumped amplifier (such as an EDFA) is used. This is reflected by the fact that a Raman amplifier typically has a lower NF than an equivalent lumped amplifier. As a general rule, the higher the average gain provided by a Raman amplifier, the lower its NF.

The average gain of a Raman amplifier can be adjusted by controlling the amount of Raman pump power injected into the transmission fiber. Furthermore, if the Raman amplifier includes at least two pumps with different wavelengths and means to separately control the power emitted by each pump, then the spectral shape of the gain may also be controlled to a certain degree. Thus, variable gain functionality can be achieved and the gain tilt may also be adjusted independently of the average gain. Raman amplifiers including average gain control and gain tilt control are known.

While Raman amplifiers typically have lower NF than equivalent lumped amplifiers, they are usually restricted in the amount of gain they provide, mainly due to the fact that higher gain requires higher levels of Raman pump power to be injected into the transmission fiber. This both increases the cost of the system and also increases the chance for potential safety hazards and damage related to the propagation of very high levels of pump power in the transmission fiber. Furthermore, very high values of Raman gain are also associated with high levels of double Rayleigh backscattering, which can detrimentally affect system performance.

To overcome this problem, a Raman amplifier is often used in conjunction with a lumped amplifier such as an EDFA, thus forming a so called hybrid Raman-lumped amplifier (also referred to herein simply as "hybrid amplifier" and in short "HA"). In this configuration the Raman amplifier is used as a pre-amplifier while the lumped amplifier is used as a booster amplifier. Since the total NF of an amplifier is usually dominated by the NF of the pre-amplifier, the HA benefits from the low NF of the Raman amplifier. On the other hand, the lumped amplifier booster can provide the extra gain not provided by the Raman amplifier, thus allowing the total gain of the hybrid amplifier to be as high as required.

Some degree of variable gain functionality for a HA can be achieved through control of the gain of the Raman amplifier, as described above. However, since the total gain imparted by the Raman amplifier part of the HA is usually limited, and since it is often difficult to control a Raman amplifier operating at very low gain, the total dynamic gain range achievable using this method is limited. Thus, it is often beneficial for the lumped amplifier part of the hybrid to provide variable gain functionality as well, thus improving the variable gain functionality of the HA as a whole. In such a case, a key question is how to divide the total gain of the HA between the Raman amplifier and the lumped amplifier, while at the same time minimizing the overall NF of the HA. A known method for achieving this is by storing a database of the HA NF as a function of the Raman amplifier gain for different values of total HA gain. Thus, for a given required total HA gain, the Raman amplifier gain that provides the minimum NF can be found and set accordingly. Then, the lumped amplifier average gain is set to provide the remaining gain needed to achieve the required total HA gain. However, this method does not account for the spectral dependence of the gain in WDM systems, and therefore does not take into account the added degree of freedom which is available through controlling the gain tilt (not just the average gain) of the Raman amplifier and lumped amplifier.

Another known solution implements optimization of the spectral shape of the Raman amplifier gain in order to optimize the HA NF. This is achieved by providing a higher Raman gain in the spectral region where the lumped amplifier has the highest NF, thus reducing the total HA NF in that spectral region. However, the total gain of the HA NF is assumed to be fixed, so that the optimization of the NF in the case of a variable gain HA is not considered at all.

There is therefore a need for, and it would be advantageous to have, a variable gain hybrid amplifier and methods for optimizing the NF in a variable gain hybrid amplifier, in which both the average gain and gain tilt of the Raman amplifier and the lumped amplifier can be controlled independently.

SUMMARY

Hereinafter in this description, average gain is marked by "G" and gain tilt is marked by "T" in the form $G_R$ and $T_R$, $G_L$ and $T_L$, and $G_H$ and $T_H$, with subscripts, "R", "L" and "H" referring respectively to "Raman", "lumped" and "hybrid". These symbols are used to express "parameters". When the parameters receive a value, the same symbols are used with "value" following, i.e. "$T_R$ value", "$T_R$ value", "$G_L$ value", "$T_L$ value", "$G_H$ value" and "$T_H$ value".

In some embodiments there are provided methods for optimizing the noise figure of a variable gain hybrid amplifier which includes a variable gain Raman amplifier section (or "unit") with adjustable average gain $G_R$ and gain tilt $T_R$ and a variable gain lumped amplifier section with adjustable average gain $G_L$ and gain tilt $T_L$. In some embodiments there are provided hybrid amplifiers implementing the methods disclosed herein. Hereinafter and for simplicity, "Raman amplifier" and "lumped amplifier" are used instead of "Raman amplifier section" or "lumped amplifier section". In various embodiments, the methods include receiving as input a required hybrid amplifier average gain $G_H$ value and gain tilt $T_H$ value and deriving a set of $G_R$, $T_R$, $G_L$, $T_L$ values which yield an optimized hybrid amplifier NF and satisfy at least one given condition. In an embodiment, one condition is that $G_R+G_L=G_H$. In another embodiment, one condition is that $G_R+G_L=G_H$ and another condition is that the sum of the derived $T_R$ and $T_L$ values ($T_R+T_L$) is within a specified hybrid amplifier operating tilt range. In yet another embodiment, the conditions are $G_R+G_L=G_H$ and $T_R+T_L=T_H$.

In an embodiment there is provided a variable gain hybrid amplifier having a hybrid amplifier average gain $G_H$ and including a variable gain Raman amplifier with adjustable average gain $G_R$ and gain tilt $T_R$ and a variable gain lumped amplifier with adjustable average gain $G_L$ and gain tilt $T_L$, the hybrid amplifier comprising a control unit adapted to set $G_R$, $T_R$, $G_L$ and $T_L$ to respective $G_R$, $T_R$, $G_L$ and $T_L$ values such as to optimize a hybrid amplifier noise figure.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein, and should not be considered limiting in any way.

DETAILED DESCRIPTION

Figure 1:
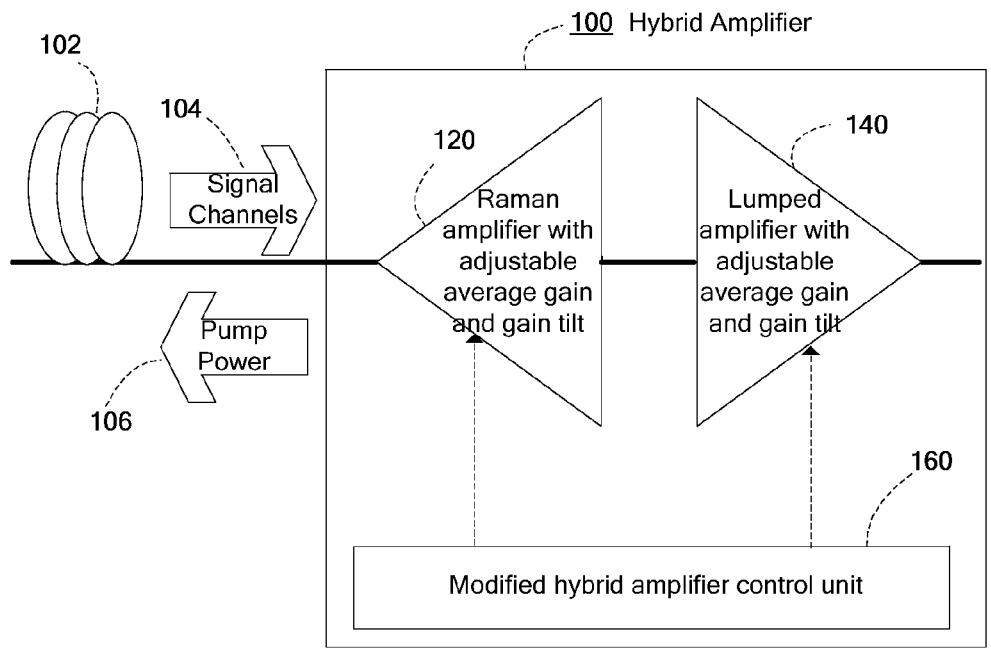
FIG. 1 shows schematically a hybrid amplifier (HA) according to one embodiment disclosed herein.

FIG. 1 shows schematically a variable gain hybrid amplifier 100 according to one embodiment disclosed herein. Hybrid amplifier 100 is connected to fiber span 102 and is designed to amplify WDM signal channels 104. Hybrid amplifier 100 includes two amplifier sections: a variable gain Raman amplifier (RA) 120 and a variable gain lumped amplifier (LA) 140. Each amplifier has adjustable average gain and gain tilt functionality. Raman amplifier 120 injects pump power 106 into fiber span 102 in a backward pumping configuration, thus amplifying WDM signal channels 104 as they propagate through the fiber span. WDM signal channels 104 then enter HA 100 and are further amplified by LA 140. Hybrid amplifier 100 is controlled by a "modified" control unit 160.

Figure 1A:
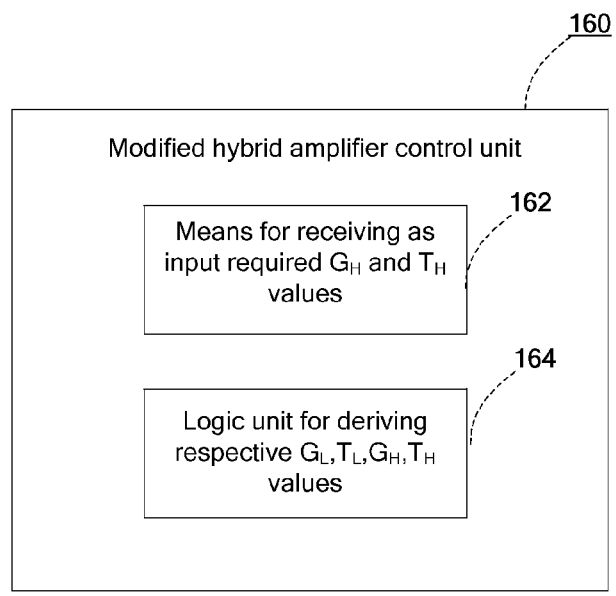
FIG. 1a shows schematically details of the control unit of FIG. 1 according to one embodiment disclosed herein.
Figure 2:
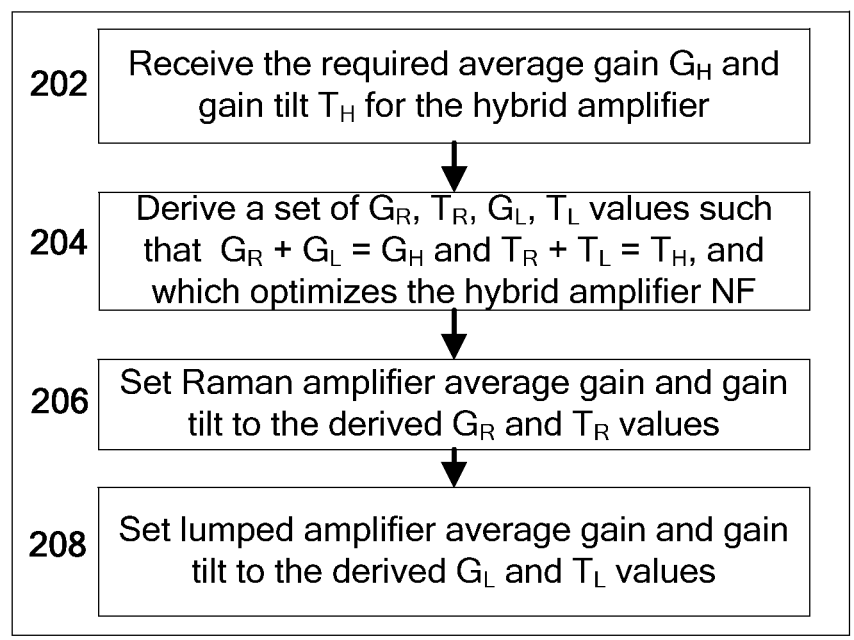
FIG. 2 shows a flow chart detailing the operation of the control unit of the HA in FIG. 1.

Details of an embodiment of modified control unit 160 are shown schematically in FIG. 1a and its operation is illustrated by the flow chart in FIG. 2. In an embodiment, control unit 160 includes means 162 to receive as input a required $G_H$ value, and a logic module 164 configured to derive respective $G_R$, $T_R$, $G_L$ and $T_L$ values such as to achieve an optimized HA noise figure (NF) and such that $G_H$ is set to the required $G_H$ value. Here and in the following description, "optimized" means that the NF is at the minimal possible value for the given operating conditions (e.g. given values of $G_H$ and/or $T_H$), or sufficiently close to the minimal value for the application for which the amplifier is designed and specified.

In another embodiment, means 162 may receive as input a required $G_H$ value and a required $T_H$ value, and logic module 164 is configured to derive respective $G_R$, $T_R$, $G_L$ and $T_L$ values such as to optimize the hybrid amplifier noise figure and such that $G_H$ and $T_H$ are set respectively to the required $G_H$ and $T_H$ values. Thus, the "modified" aspect relates to the capability of the control unit to control both average gain and gain tilt of each HA amplifier section in such a way as to optimize the HA NF.

In an embodiment, the hybrid amplifier may be a single integrated unit. In another embodiment, the hybrid amplifier may comprise physically separate Raman and lumped amplifier units which communicate with a separate modified control unit 160, where control unit 160 may be integrated within a management module of the system (not shown). In another embodiment, the hybrid amplifier may comprise an integrated unit including a Raman amplifier and a lumped amplifier, which communicates with a separate modified control unit 160 which may be integrated within the management module of the system.

Referring now to FIG. 2, in step 202, control unit 160 receives as input required $G_H$ and $T_H$ values for the hybrid amplifier. This step may occur at startup (turn on) of the HA, or may be executed during operation of the HA due to an externally initiated change in $G_H$ and/or $T_H$. If step 202 occurs during startup of the HA, then the $G_H$ and $T_H$ values may exemplarily be retrieved from a previously set memory location within control unit 160. If step 202 occurs during operation due to an externally initiated change, then the $G_H$ and $T_H$ values may for example be received from the management unit of the system in which the hybrid amplifier is integrated.

Optionally, only $G_H$ may be received as input, while the amplifier is designed and specified to operate within a certain pre-defined range of gain tilt values. This could be achieved by specifically defining the range of gain tilts (for example, the gain tilt could be specified to be in the range −1 dB to +1 dB). Alternatively, this could be achieved by specifying the spectral gain flatness (for example, the amplifier could be specified to operate with a peak-to-peak spectral gain flatness less than 2 dB).

In step 204, the control unit derives a set of values for $G_R$ and $T_R$ and for $G_L$ and $T_L$. The set of values is derived such that the NF of HA is optimized for the given values of $G_H$ and $T_H$, and such that $G_R+G_L=G_H$, and $T_R+T_L=T_H$. The latter two equalities should be interpreted to be within the specified accuracy of the hybrid amplifier. For example, if the specified gain accuracy of the amplifier is 0.5 dB, then this means that $G_H-0.5$ dB $<G_R+G_L<G_H+0.5$ dB. In the optional case where only $G_H$ is received as input in step 202, then instead of satisfying the condition $T_R+T_L=T_H$, $T_R+T_L$ should be within the specified range of gain tilts, or should be such that the spectral gain flatness is within the specified range.

The set of $G_R$, $T_R$, $G_L$ and $T_L$ values may be stored for example in a lookup table (LUT) within a memory (not shown) of control unit 160 such that, given required $G_H$ and $T_H$ values, the control unit can retrieve the set of values from the LUT. Extrapolation and interpolation procedures known in the art may be further utilized to retrieve a set of $G_R$, $T_R$, $G_L$, $T_L$ values for which there are no entries in the LUT corresponding to the exact given values of $G_H$ and $T_H$. Alternatively, the set of $G_R$, $T_R$, $G_L$, $T_L$ values may be derived from pre-defined formulae relating these values to the values of $G_H$ and $T_H$. Alternatively, part of the set of values may be derived from a LUT, while the remaining values from the set derived from formulae. For example, $G_R$ and $T_R$ values may be derived from a LUT, while $G_L$ and $T_L$ values may be derived from the formulae $G_R+G_L=G_H$, and $T_R+T_L=T_H$.

In step 206, the control unit sets $G_R$ and $T_R$ to the $G_R$ and $T_R$ values derived in step 204. To execute this step, control unit 160 may for example communicate the values of $G_R$ and $T_R$ to Raman amplifier 120, which then performs the actual setting of the values.

In step 208, the control unit sets $G_L$ and $T_L$ to the $G_L$ and $T_L$ values derived in step 204. To execute this step, control unit 160 may for example communicate the values of $G_L$ and $T_L$ to lumped amplifier 140, which then performs the actual setting of the values.

Figure 3:
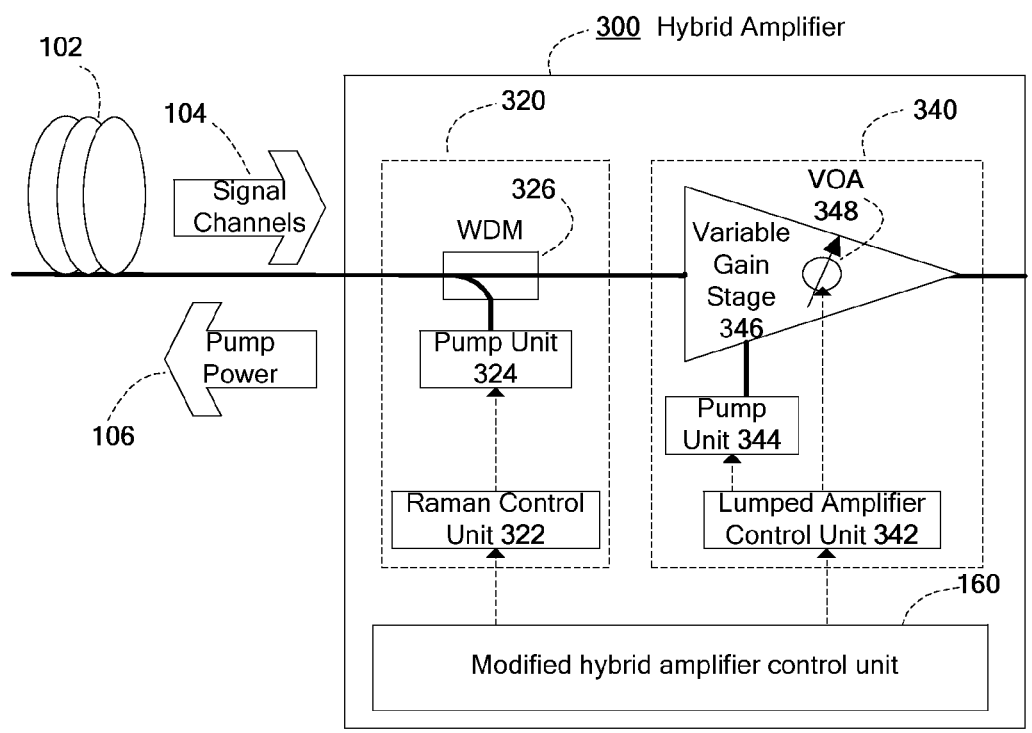
FIG. 3 shows schematically a hybrid amplifier according to another embodiment disclosed herein.

FIG. 3 shows schematically a hybrid amplifier 300 according to another embodiment disclosed herein. In this embodiment, HA 300 includes a Raman amplifier 320, a lumped amplifier 340 and modified control unit 160. RA 320 includes a pump unit 324 which provides pump power 106, and a WDM 326 which multiplexes pump power 106 with incoming signal channels 104. RA 320 further includes a Raman control unit 322 which controls pump unit 324 and which communicates with control unit 160. In operation, Raman control unit 322 receives from HA control unit 160 the required $G_R$ and $T_R$ values of RA 320 (as in step 206 above) and sets the power of the pumps within pump unit 324 accordingly.

In order for Raman amplifier 320 to allow both $G_R$ and $T_R$ to be adjusted independently, pump unit 324 should comprise at least two pumps which have different wavelengths $\lambda$. By independently setting the power levels of these pumps, Raman control unit 322 may independently adjust $G_R$ and $T_R$. For example, a Raman amplifier designed to amplify WDM signal channels in the so called C-Band (typically 1528-1567 nm, or a part thereof), may include within pump unit 324 at least one pump with a wavelength in the vicinity of 1425 nm, and at least one pump with a wavelength in the vicinity of 1455 nm The $G_R$ of RA 320 may be increased by increasing the total pump power P generated by pump unit 324. Similarly, the $G_R$ of RA 320 may be decreased by decreasing P. $T_R$ can be increased by increasing the ratio of the pump power in the vicinity of 1455 nm to the pump power in the vicinity of 1425 nm Similarly, $T_R$ can be decreased by decreasing the ratio.

Raman amplifier 320 may further include an apparatus (not shown) to measure the average gain and/or the gain tilt, as described for example in co-owned US patent publication 20110141552. Such apparatus could for example allow automatic gain control (AGC) of the Raman amplifier, by enabling a feed-back control loop. Thus, control unit 322 could receive from such apparatus the actual measured average gain and/or gain tilt, and adjust the pump within pump unit 324 until the required average gain and gain tilt is achieved.

As known, Raman amplifier 320 may further include a gain flattening filter (GFF, not shown), which acts to impart a certain shape to the gain spectrum within the wavelength band of the WDM signal channels. For example, the GFF could be designed such that for a specified average gain and gain tilt, the maximum deviation of the spectral shape of the gain from a linear fit within the wavelength band should be less than a specified value (often referred to in the art as the gain flatness).

Lumped amplifier 340 includes lumped amplifier control unit 342, pump unit 344, and variable gain stage 346 which is optically connected to WDM 326, and is designed to amplifier signal channels 104. Variable gain stage 346 includes at least one active gain medium (not shown), which receives pump power from pump unit 344, the form of which depends on the type of the active gain medium. For example, if the active gain medium is a doped fiber, then pump unit 344 would provide optical pump power at an appropriate wavelength to pump the doped fiber, and variable gain stage 346 would further comprise means to couple the optical pump power to the doped fiber. Conversely, if the active gain medium is a semiconductor, then pump unit 344 would provide electrical pump power in the form of drive current. The amount of average gain provided by variable gain stage 346 can be controlled by the amount of pump power provided by pump unit 344. Increasing the pump power typically leads to increased average gain, while decreasing the pump power typically leads to decreased average gain. However, in many cases the spectral shape of the gain (and hence the gain tilt) within the signal channel wavelength band is determined by the average gain, and cannot be controlled independently simply by adjusting the pump power.

For this purpose variable gain stage 346 further includes a variable optical attenuator (VOA) 348, which allows both $G_L$ and $T_L$ to be controlled independently. In what follows we use the term "VOA attenuation", denoted by "V", to mean the attenuation of the VOA over and above a fixed minimum attenuation which characterizes the VOA. Consider for example the case where V has a value of 0 dB, and pump unit 344 is set such that $G_L$ is equal to the maximum average gain for which lumped amplifier 340 is designed, which we designate $G_{L0}$. Note that by definition $G_L$ includes all passive losses L of variable gain stage 346 such as the fixed minimum attenuation of VOA 348. This means that the active medium supplies an average gain of $G_{L0}+L$. Henceforth, we will refer to the resulting gain tilt in this situation (i.e. V=0 dB, maximum average gain) as the "nominal gain tilt" and denote it as $T_{L0}$. Now, if we set V to a value of $V_1$ dB, and pump unit 344 is adjusted to maintain a net average gain $G_L=G_{L0}-V_1$, then this means that the active medium still supplies an average gain of $G_{L0}+L$. The results of this is that $T_L$, which is determined by the average gain of the active gain medium, remains substantially unchanged, and equal to the nominal gain tilt, i.e. $T_L=T_{L0}$, even though $G_L$ has changed. Conversely, if we set V to a value of $V_1$ dB, and pump unit 344 is adjusted to achieve $G_L=G_{L0}-V_1-\Delta G$, then this means that the active medium now supplies an average gain of $G_{L0}+L-\Delta G$, which will lead to a change in $T_L$ (i.e. it will not be equal any more to $T_{L0}$). Thus, we see that by jointly controlling pump unit 344 and VOA 348, both $G_L$ and $T_L$ can be controlled independently. In operation, lumped amplifier control unit 342 receives from HA control unit 160 the required average gain value and gain tilt value of the lumped amplifier, and sets the power of pump unit 344 and the attenuation of VOA 348 accordingly.

As discussed previously, a decreased V usually leads to a decreased NF of lumped amplifier 340. Thus, it may be beneficial with respect to NF to reduce V, even if this results in a change in $T_L$ from the nominal gain tilt $T_{L0}$. For example, consider a case requiring an average gain $G_L=G_{L0}-G_1$. This can be achieved by setting V=$G_1$ dB. In this case the resulting $T_L$ will be approximately equal to $T_{L0}$. On the other hand, the same value of $G_L$ can be achieved by setting V<$G_1$ and by decreasing the pump power (relative to the case where V=$G_1$) supplied by pump unit 344. In this case, the resulting $T_L$ will be different than $T_{L0}$. However, the NF will be improved due to the reduced value of V.

Variable gain stage 346 may further include a GFF (not shown), which acts to impart a certain shape to the gain spectrum within the wavelength band of the WDM signal channels. For example, the GFF could be designed such that for maximum average gain $G_{L0}$ and nominal gain tilt $T_{L0}$, the maximum deviation of the spectral shape of the gain from a linear fit within the wavelength band should be less than a specified value (often referred to in the art as the gain flatness).

Lumped amplifier 340 may further include additional gain stages (not shown), and/or so called mid-stage access for the connection of additional optical modules such as dispersion compensation fiber. For example, variable gain stage 346 may be followed by mid-stage access and further followed by an additional booster gain stage which compensates for the loss introduced at the mid-stage.

As described above with reference to FIGS. 1 and 2, control unit 160 determines the values of $G_R$ and $T_R$ of RA 320 and the values of $G_L$ and $T_L$ of LA 340 in order to achieve the required $G_H$ and $T_H$ of HA 300 while at the same time optimizing the overall NF of HA 300. The above ability to reduce the NF of LA 340 while maintaining a required $G_L$ can be useful in minimizing the overall NF of HA 300. For example, consider first a case where $T_L$ of LA 340 is fixed at $T_L=T_{L0}$. Then, control unit 160 will set $T_R=T_H-T_{L0}$, while $G_R$ and $G_L$ will be set such that $G_R+G_L=G_H$ and the overall NF of HA 300 is optimized. Now, if $T_L$ is allowed to vary, then LA 340 can be set to maintain $G_L$ as in the previous case (where $T_L=T_{L0}$), while setting $T_L \neq T_{L0}$ in order to improve its NF (by decreasing the attenuation of VOA 348). Then, $T_R$ would be set to $T_H-T_L$, and the overall NF of HA 300 may be potentially improved due to the reduction of the NF of LA 340 (its magnitude and whether such a reduction occurs at all also depend on the change in NF of Raman amplifier 320 due to the change in $T_R$).

Figure 4:
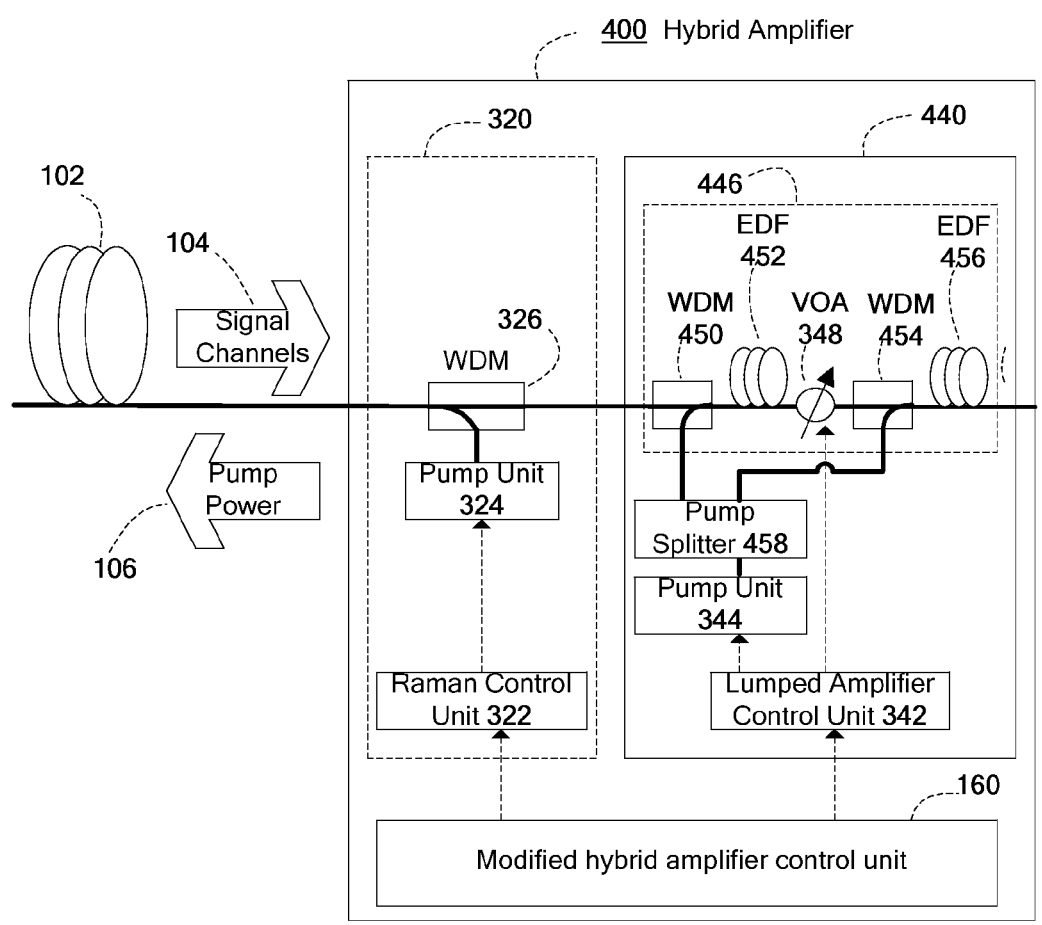
FIG. 4 shows schematically a hybrid amplifier according to yet another embodiment disclosed herein.

FIG. 4 shows schematically a hybrid amplifier 400 according to another embodiment disclosed herein. In this embodiment, HA 400 includes RA 320, a lumped amplifier in the form of an EDFA 440 and control unit 160. EDFA 440 includes a variable gain stage 446, pump unit 344, lumped amplifier control unit 342 and a pump splitter 458. Variable gain stage 446 includes two Erbium doped fiber (EDF) gain stages 452 and 456, with VOA 348 positioned therebetween. The pump power supplied by pump unit 344, which is typically in the vicinity of 980 nm, is split into two by pump splitter 458 and coupled to both EDF gain stages 452 and 456 in a forward pumping configuration via WDMs 450 and 454 respectively. The specific configuration for EDFA 440 shown and described herein is given by way of example only. Other configurations of EDFA 440 are possible, for example, but not limited to using 1480 nm pump power, employing a backward pumping configuration, using additional sections of EDF, or using additional VOAs, including mid-stage access.

The general principle of operation of HA 400 is similar to that of HA 300. The more specific aspects of this operation will now be described with the aid of FIGS. 5-7, which correspond to a specific design of HA 400 with the following characteristics: amplifier 400 is designed to operate in the C-Band with average gain in the range of 19-36 dB. Raman amplifier 320 is designed such that when the pumps in pump unit 324 operate at maximum power, the average gain is 14 dB, while the gain tilt is 0 dB. EDFA 440 is designed to operate with average gain in the range of 9-25 dB, with nominal gain tilt $T_{L0}=-1$ dB (as defined previously, the nominal gain tilt is the gain tilt at maximum average gain, in this case 25 dB, with the VOA attenuation set to zero). The gain tilts of both EDFA 440 and Raman amplifier 320 can be controlled independently of their respective average gains, though some limitations apply. For example, when the Raman amplifier is operating with $G_R$ of 14 dB, only gain tilt in the vicinity of 0 dB is possible, due to the limits in available pump power from pump unit 324. While FIGS. 5-7 refer to this specific design of HA 400, it is to be understood that similar principles to those described apply to other designs.

Figure 5:
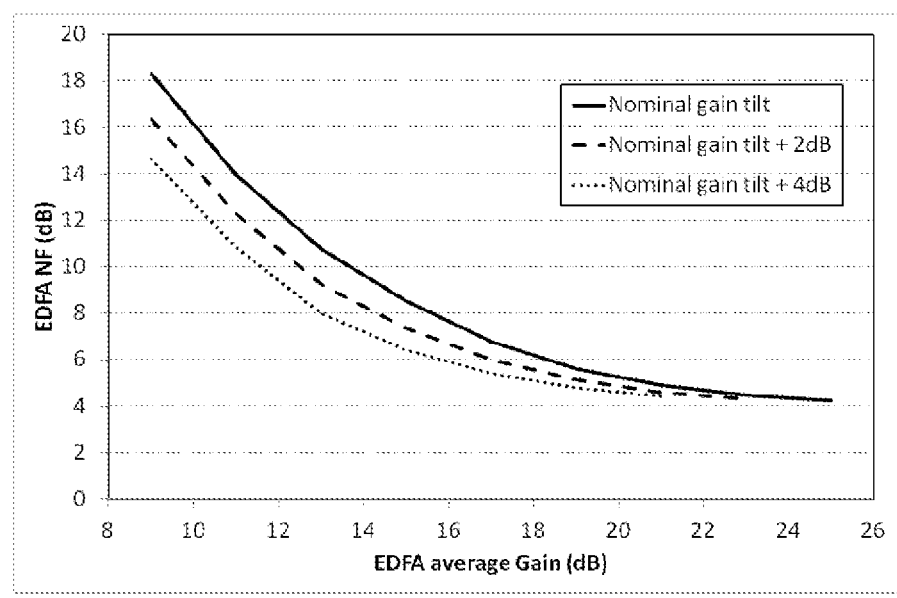
FIG. 5 shows an example graph illustrating the dependence of the EDFA NF as a function of the EDFA average gain, for different values of the EDFA gain tilt.

FIG. 5 shows example plots of the NF of EDFA 440 as a function of $G_L$. Three separate plots are shown, each for a different value of $T_L$. One plot corresponds to the nominal gain tilt $T_L=T_{L0}$ while the other two plots correspond to gain tilt values of $T_{L0}+2$ dB and $T_{L0}+4$ dB. As shown, in all cases the NF increases with decreased $G_L$, due to the increased VOA attenuation V. However, the larger (i.e. the more positive) $T_L$, the better the NF. This latter result can be understood as follows: in order to reduce $G_L$ from 25 dB to 25−X dB while maintaining $T_L=T_{L0}$, V is set to a value of X dB. If now we wish to increase $T_L$ (i.e. make it more positive), then the pump power from pump unit 344 should be decreased. This is due to the typical spectral gain shape of EDF, which has a higher emission coefficient at the short wavelength (so called blue) end of the C-Band, compared to the longer wavelength (so called red) end of the C-Band. However, once we decrease the pump power, then $G_L$ also decreases. In order to reset $G_L$ to 25−X dB, V should then be set to some value lower than X dB. Thus, we see that increasing $T_L$ while maintaining $G_L$ causes V to be decreased. Thus, the NF improves as the gain tilt increases.

Figure 6:
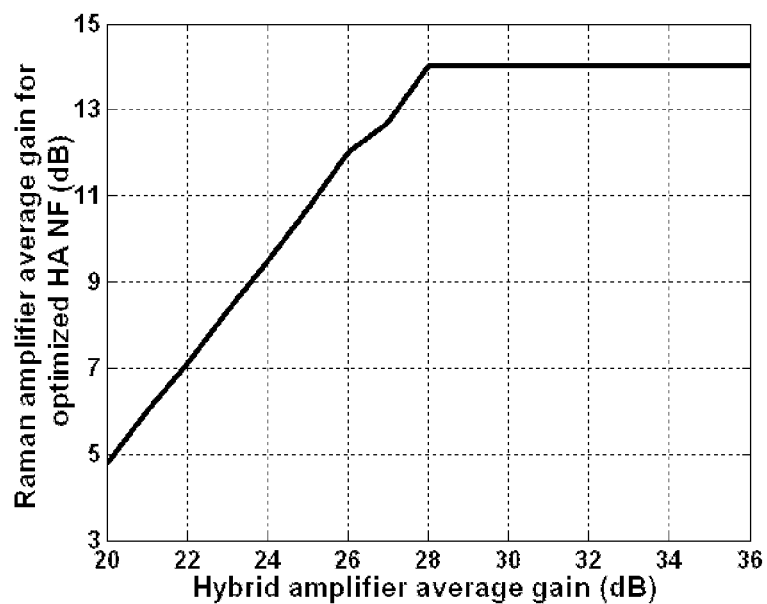
FIG. 6 shows an example graph illustrating the dependence of $G_R$ at which the HA NF is optimized on $G_H$, assuming $T_R$ and $T_L$ are kept constant at their nominal values.

FIG. 6 shows the value of $G_R$ of Raman amplifier 320 required to achieve the optimized NF for any given value of $G_H$. Here it is assumed that $T_L$ is kept constant at its nominal values and not allowed to change. As seen, for $G_H \geq 28$ dB, $G_R$ is constant at 14 dB, which is the maximum value. For $G_H<28$ dB, $G_R$ decreases monotonically as a function of $G_H$. This result can be understood as follows: as known in the art, $NF_H$, the NF of HA 400 is primarily dominated by $NF_R$, the NF of Raman amplifier 320 which functions as a pre-amplifier, and to a much lesser extent by the $NF_L$, the NF of EDFA 446, which functions as a booster amplifier. Thus, in most cases it is preferable to increase $G_R$ to the maximum, which reduces $NF_R$ and thus reduces $NF_H$. However, since $G_L=G_H-G_R$, and assuming we keep $G_R$ at the maximum value, then as $G_H$ decreases, $G_L$ also decreases. Referring to FIG. 5 we see that this leads to an increase in $NF_L$. At $G_H=28$ dB, which corresponds to $G_L=14$ dB assuming that $G_R=14$ dB, we see that $NF_L$ is about 10 dB for $T_L=T_{L0}$, which already is large enough to have a dominant effect on $NF_H$, even given the fact that EDFA 446 is a booster amplifier. Thus, for $G_H<28$ dB it becomes beneficial with respect to $NF_H$ to reduce $G_R$ in order to avoid further decrease in $G_L$, and hence further increase in $NF_L$.

Figure 7:
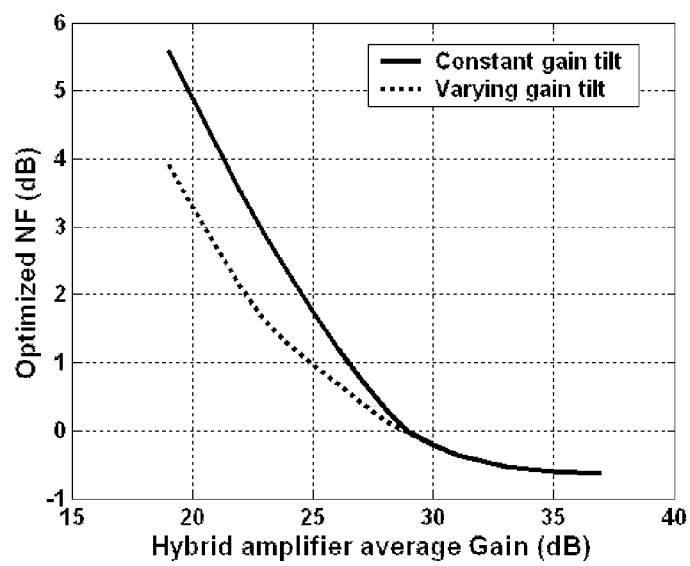
FIG. 7 shows an example graph illustrating the dependence of the optimized HA NF on the HA average gain (a) in the case where $T_R$ and $T_L$ are kept constant at their nominal values, and (b) in the case where $T_R$ and $T_L$ are allowed to vary.

FIG. 7 shows an example graph illustrating the dependence of the HA NF on the HA average gain: (a) in the case where $T_L$ is kept constant at its nominal value, and (b) in the case $T_L$ is allowed to vary from its nominal value. The solid line in FIG. 7 shows the optimized NF of HA 400 as a function of $G_H$ corresponding to the conditions of FIG. 6, i.e. assuming that the gain tilt $T_L$ of EDFA 446 is kept constant at its nominal value. On the other hand, the dashed line in FIG. 7 shows the optimized NF of HA 400 as a function of $G_H$ for the conditions where we allow $T_L$ to vary from its nominal value, while keeping the total gain tilt $T_H=T_R+T_L$ of HA 400 constant. $T_L$ is allowed to vary in the range of −1 dB to +3 dB, which is the gain tilt range supported by EDFA 446. $T_R$ is allowed to take any value subject to the restriction that $G_R+|T_R|\geq 14$ dB. This restriction is due to the limits of the available pump power from pump unit 324.

Figure 8A:
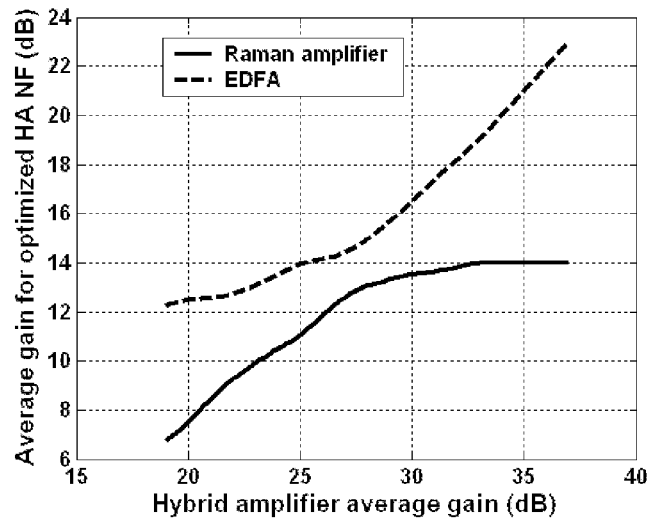
FIG. 8a shows an example graph illustrating the dependence of $G_R$ and $G_L$ at which the HA NF is optimized on $G_H$.
Figure 8B:
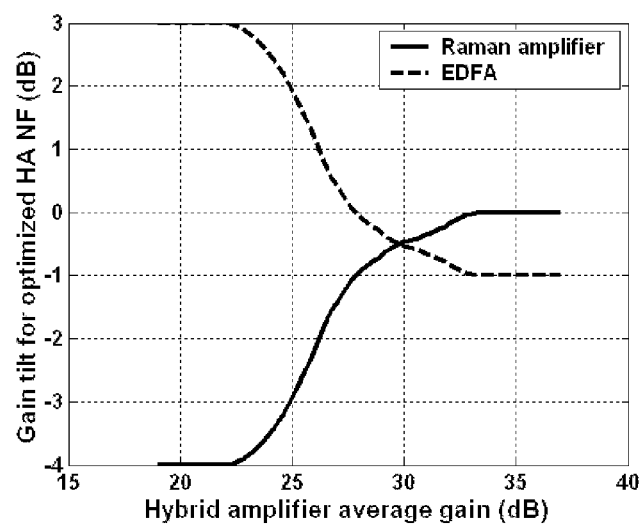
FIG. 8b shows an example graph illustrating the dependence of $T_R$ and $T_L$ at which the HA NF is optimized on $G_H$.

As seen, the minimum NF in the case where $T_L$ is allowed to vary from its nominal value is consistently less than for the case where $T_L$ is kept constant at its nominal value, with the difference reaching about 1.5 dB for $G_H=20$ dB. This result can be understood with reference to FIG. 8a, which shows the values of $G_L$ and $G_R$ for which the optimized NF is achieved as a function of $G_H$, and to FIG. 8b, which shows the values of $T_L$ and $T_R$ for which the optimized NF is achieved as a function of $G_H$. For values of $G_H>31$ dB, $T_L$ remains at its nominal value, since the effect of $NF_L$ on the $NF_H$ is negligible. However, as $G_L$ decreases (since as before, it is preferable to keep $G_R$ as high as possible), and $NF_L$ becomes larger and more dominant, then it becomes preferable to increase $T_L$ to benefit from the decrease in $NF_L$ shown in FIG. 5. $T_L$ continues to increase until it reaches the maximum value (+3 dB) supported by EDFA 446. To summarize, we see that by increasing $T_L$ as $G_H$ decreases, the NF of HA 400 can be minimized compared to case where $T_L$ is kept constant at its nominal value.

Figure 9:
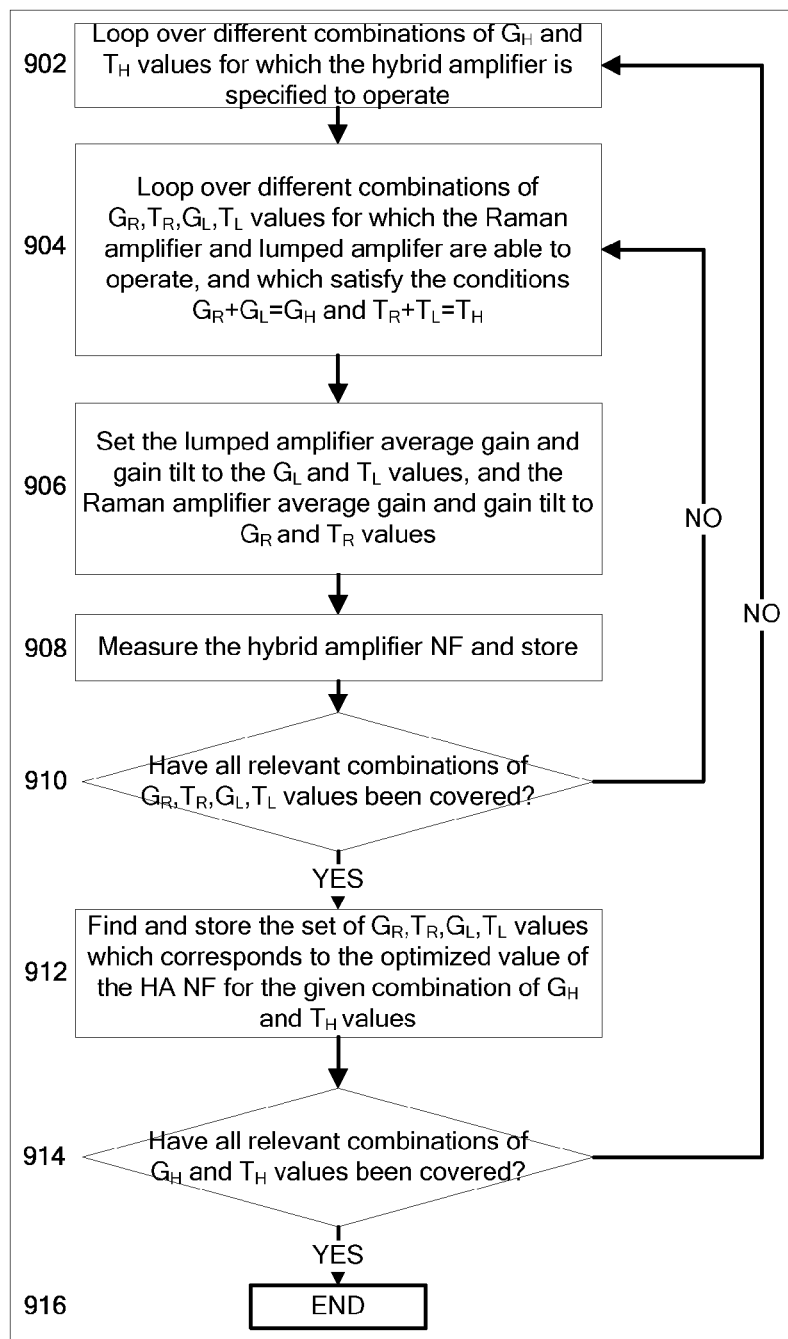
FIG. 9 shows an example procedure for finding the set of $G_R$, $T_R$, $G_L$ and $T_L$ values which optimize the HA NF for each value of the $G_H$ and $T_H$.

FIG. 9 shows in a flow chart an exemplary procedure for finding the optimal operating conditions of a hybrid amplifier in the form of a set of $G_R$, $T_R$, $G_L$, $T_L$ values for each given combination of $G_H$ and $T_H$ values. The procedure may be used to construct the lookup tables and/or formulae which form the basis of the operation of control unit 160 in FIGS. 1, 3 and 4. The aim is to find the set of $G_R$, $T_R$, $G_L$ and $T_L$ values for which the HA NF is optimized for given $G_H$ and $T_H$ values. The procedure starts in step 902 by looping over different combinations of $G_H$ and $T_H$ values which cover with sufficient resolution the range of combinations for which the hybrid amplifier is specified to operate. By sufficient resolution we mean that by using standard and known interpolation and/or extrapolation procedures, it is also possible to find the set of $G_R$, $T_R$, $G_L$, $T_L$ values for which the HA NF is optimized for a combination of $G_H$ and $T_H$ values that is not specifically covered by the loop in step 902. The procedure then proceeds to step 904 where for the required $G_H$ and $T_H$ values, a loop is executed over different combinations of $G_R$, $T_R$, $G_L$ and $T_L$ values which cover with sufficient resolution the range of combinations for which the Raman amplifier and lumped amplifier are able to operate, and which satisfy the conditions $G_L+G_R=G_H$ and $T_L+T_R=T_H$. The meaning of sufficient resolution in step 904 will be clarified further with respect to step 912. The procedure then proceeds to step 906 where $G_R$ and $T_R$ are set to respective $G_R$ and $T_R$ values, and where $G_L$ and $T_L$ are set to respective $G_L$ and $T_L$ values, after which the HA NF is measured in step 908 and stored. In step 910 a check is performed to see whether all relevant combinations of $G_R$ and $T_R$ values have been covered. If NO, then the procedure returns to step 904 and a new combination of $G_R$, $T_R$, $G_L$, $T_L$ values is chosen. If YES, then step 912 is executed where the combination of $G_R$, $T_R$, $G_L$, $T_L$ values which corresponds to the optimal value of the HA NF is found, and this combination is stored for the given values of $G_H$ and $T_H$. Here we clarify further the meaning of the term "cover with sufficient resolution" used above with respect to step 904. This means that at least one of the combinations covered in step 904 yields an HA NF which is sufficiently close to the minimum NF for the application for which the amplifier is designed. Next, step 914 checks to see whether all relevant combinations of $G_H$ and $T_H$ values have been covered. If NO, then the procedure returns to step 902 and a new combination of $G_H$ and $T_H$ values is chosen. If YES, then the procedure ends.

The result of the procedure is a LUT where for each combination of $G_H$ and $T_H$ values, there is stored a combination $G_R$, $T_R$, $G_L$, $T_L$ values which results in the optimized HA NF. This LUT can be directly used in control unit 160, or alternatively it can be used to derive some formulae relating $G_R$, $T_R$, $G_L$, $T_L$ values to $G_H$ and $T_H$ values, for example by using a fitting procedure.

Various considerations could be used to make the procedure described in FIG. 9 more efficient. For example in the case of HA 400 where it is known that the minimum NF occurs when $T_L$ is larger than $T_{L0}$, step 904 could be made more efficient by further restricting the combinations of $G_R$, $T_R$, $G_L$, $T_L$ values such that the condition $T_L > T_{L0}$ is satisfied.

While this disclosure has been described in terms of certain embodiments, alterations and permutations of the embodiments will be apparent to those skilled in the art. The disclosure is to be understood as not limited by the specific embodiments described herein, but only by the scope of the appended claims.

The invention claimed is:

1. A method for operating a variable gain hybrid amplifier to optimize a noise figure, the hybrid amplifier having an adjustable average gain $G_H$ and including a variable gain Raman amplifier with adjustable average gain $G_R$ and gain tilt $T_R$ and a variable gain lumped amplifier with adjustable average gain $G_L$ and gain tilt $T_L$, the method comprising the steps of:
   a) receiving as input a required hybrid amplifier average gain $G_H$ value; and
   b) deriving a set of $G_R$, $T_R$, $G_L$, and $T_L$ values such that the hybrid amplifier noise figure is optimized, wherein the derived $G_R$ and $G_L$ values satisfy the condition $G_R + G_L = G_H$ and wherein the derived $T_R$ and $T_L$ values satisfy the condition that $T_R + T_L$ is within a specified hybrid amplifier operating gain tilt range.

2. The method of claim 1, wherein the hybrid amplifier further has an adjustable gain tilt $T_H$ and wherein the step of receiving as input further includes receiving a required $T_H$ value and wherein the derived $T_R$ and $T_L$ values satisfy the condition $T_R + T_L = T_H$.

3. The method of claim 1, further comprising the step of:
   c) setting the Raman amplifier $G_R$ and $T_R$ to respectively the derived $G_R$ and $T_R$ values and setting $G_L$ and $T_L$ to respectively the derived $G_L$ and $T_L$ values.

4. The method of claim 1, wherein the step of deriving includes retrieving the set of $G_R$, $T_R$, $G_L$ and $T_L$ values from a lookup table.

5. The method of claim 1, wherein the step of deriving includes retrieving the set of $G_R$, $T_R$, $G_L$ and $T_L$ values from a formula.

6. The method of claim 1, wherein the lumped amplifier gain tilt has a nominal value $T_{L0}$ and wherein the derived $T_L$ value is different from the $T_{L0}$ value for at least some $G_H$ values.

7. The method of claim 6, wherein the lumped amplifier is an Erbium doped fiber amplifier and wherein the derived $T_L$ value is larger than the $T_{L0}$ value.

8. The method of claim 3, wherein the lumped amplifier is specified to operate at a maximum average gain $G_{L0}$ value and wherein the lumped amplifier includes a variable optical attenuator (VOA) with attenuation V and wherein, as a result of the setting of the $G_R$, $T_R$, $G_L$ and $T_L$ values, V is set to a value that satisfies the condition $V < G_{L0} - G_L$ for at least some $G_H$ values.

9. A variable gain hybrid amplifier with an adjustable average gain $G_H$, the hybrid amplifier including a variable gain Raman amplifier with adjustable average gain $G_R$ adjustable average gain tilt $T_R$ and a variable gain lumped amplifier with adjustable average gain $G_L$ and adjustable average gain tilt $T_L$, the hybrid amplifier comprising a control unit adapted to set $G_R$, $T_R$, $G_L$ and $T_L$ to respective $G_R$, $T_R$, $G_L$, and $T_L$ values, the control unit including means to receive as input a required $G_H$ value and a logic module configured to derive the respective $G_R$, $T_R$, $G_L$, and $T_L$ values such as to optimize a hybrid amplifier noise figure and such that $G_H$ is set to the required $G_H$ value, wherein the derived $T_R$ and $T_L$ values satisfy the condition that $T_R + T_L$ is within a specified hybrid amplifier operating tilt range.

10. The hybrid amplifier of claim 9, wherein the logic module includes a lookup table.

11. The hybrid amplifier of claim 9, wherein the logic module uses a formula to derive the respective $G_R$, $T_R$, $G_L$ and $T_L$ values.

12. The hybrid amplifier of claim 9, wherein the hybrid amplifier further has an adjustable gain tilt $T_H$, wherein the control unit further includes means to receive as input a required $T_H$ value, and wherein the logic module is configured to derive, based on the $G_H$ and $T_H$ values, the respective $G_R$, $T_R$, $G_L$ and $T_L$ values such as to optimize the hybrid amplifier noise figure and such that both $G_H$ and $T_H$ are set respectively to the required $G_H$ and $T_H$ values.

13. The hybrid amplifier of claim 9, wherein the lumped amplifier is specified to operate at a maximum average gain $G_{L0}$ value, wherein the lumped amplifier includes a variable optical attenuator (VOA) with attenuation V which receives a value that satisfies the condition $V < G_{L0} - G_L$ for at least some $G_H$ values.

14. The hybrid amplifier of claim 9, wherein the lumped amplifier has a nominal gain tilt value $T_{L0}$, and wherein the derived $T_L$ value is different than the $T_{L0}$ value for at least some $G_H$ values.

15. The hybrid amplifier of claim 14, wherein the lumped amplifier is an Erbium doped fiber amplifier (EDFA), and wherein the derived EDFA $T_L$ value is larger than the $T_{L0}$ value for at least some $G_H$ values.

16. A variable gain hybrid amplifier having an adjustable average gain $G_H$ and comprising:
   a) a variable gain Raman amplifier with independently adjustable average gain $G_R$ and gain tilt $T_R$;
   b) a variable gain lumped amplifier with independently adjustable average gain $G_L$ and gain tilt $T_L$; and
   c) a control unit adapted to independently set each of $G_R$, $T_R$, $G_L$ and $T_L$ to respective $G_R$, $T_R$, $G_L$ and $T_L$ values such as to optimize a hybrid amplifier noise figure.

17. The hybrid amplifier of claim 16, wherein the hybrid amplifier further has an adjustable gain tilt $T_H$, wherein the control unit includes means to receive as input a required $G_H$ value and a required $T_H$ value and a logic module configured to derive, based on the $G_H$ and $T_H$ values, the respective $G_R$, $T_R$, $G_L$ and $T_L$ values such as to optimize the hybrid amplifier noise figure and such that $G_H$ and $T_H$ are set respectively to the required $G_H$ and $T_H$ values.

18. The hybrid amplifier of claim 16, wherein the lumped amplifier is specified to operate at a maximum average gain $G_{L0}$ value, wherein the lumped amplifier includes a variable optical attenuator (VOA) with attenuation V which receives a value that satisfies the condition $V < G_{L0} - G_L$ for at least some $G_H$ values.

19. The hybrid amplifier of claim 16, wherein the lumped amplifier has a nominal gain tilt value $T_{L0}$, and wherein the derived $T_L$ value is different than the $T_{L0}$ value for at least some $G_H$ values.

20. The hybrid amplifier of claim 16, wherein the lumped amplifier is an Erbium doped fiber amplifier (EDFA), and wherein the derived EDFA $T_L$ value is larger than the $T_{L0}$ value for at least some $G_H$ values.

* * * * *